United States Patent [19]
Kiesewetter et al.

[11] 3,977,275
[45] Aug. 31, 1976

[54] GEAR MECHANISM FOR TRANSMISSION OF SMALL FORCES

[75] Inventors: Lothar Kiesewetter; Walter Schweizer, both of Berlin, Germany

[73] Assignee: VDO Adolf Schindling AG, Frankfurt am Main, Germany

[22] Filed: Oct. 4, 1974

[21] Appl. No.: 512,096

[30] Foreign Application Priority Data
Oct. 17, 1973 Germany............................ 2352016

[52] U.S. Cl.................................. 74/800; 74/640; 74/416; 58/125 R
[51] Int. Cl.² ...................... F16H 1/28; G04B 19/02
[58] Field of Search ............ 74/800, 640, 416, 3.54; 58/125 R, 7, 25 D, 26

[56] References Cited
UNITED STATES PATENTS

| | | | |
|---|---|---|---|
| 2,821,063 | 1/1958 | Sundt............................ | 58/125 R X |
| 2,849,897 | 9/1958 | Walma................................ | 74/640 |
| 3,190,066 | 6/1965 | Gardes et al.................. | 58/125 R X |
| 3,258,994 | 7/1966 | Gorfin................................ | 74/800 |
| 3,532,005 | 10/1970 | Bremmer, Jr. et al............ | 74/800 X |
| 3,661,028 | 5/1972 | Fuchs................................ | 74/416 X |
| 3,796,898 | 3/1974 | Kleinwaechter.................. | 74/640 X |

*Primary Examiner*—Samuel Scott
*Assistant Examiner*—Lance W. Chandler
*Attorney, Agent, or Firm*—Otto John Munz

[57] ABSTRACT

A gear mechanism for transmission of small forces, such as in a hand mechanism gear for clocks or watches which has a driving shaft, a driven shaft coaxial thereto, two gearwheels developed as crown wheels, mounted coaxially engaging each other over a small portion of their circumferences and having each a different number of teeth, one of these gearwheels being stationary and the other rotary. A coupling means such as a clutch is fastened to the driving shaft for rotation therewith. The clutch and the two gearwheels are mounted in relation to each other in such a manner that when the clutch rotates with the driving shaft, the rotary gearwheel resting on the driven shaft, while itself rotating, rolls off on the stationary gearwheel.

9 Claims, 7 Drawing Figures

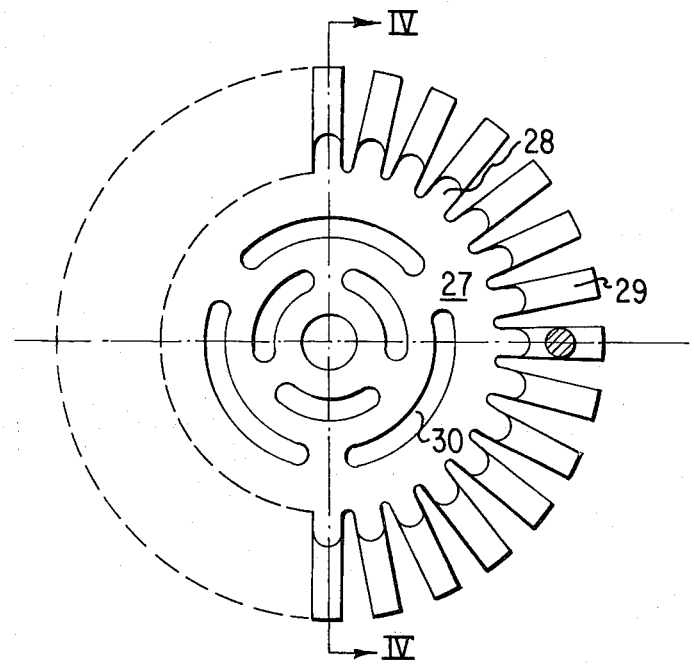
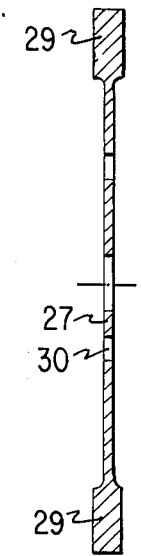
FIG. 3  FIG. 4
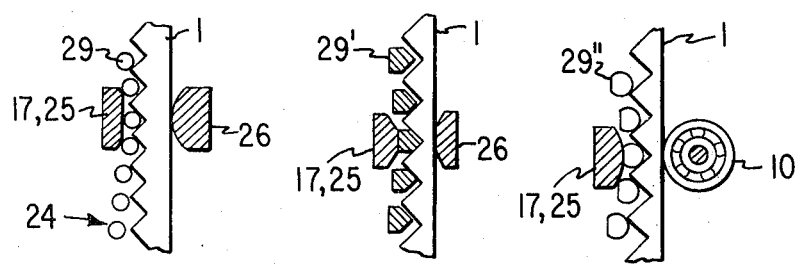
FIG. 5  FIG. 6  FIG. 7

GEAR MECHANISM FOR TRANSMISSION OF SMALL FORCES

CROSSREFERENCE TO A RELATED APPLICATION

Priority of corresponding patent application filed in Germany on Oct. 17, 1973, No. P23520.6 is claimed under the Convention.

DESCRIPTION OF THE PRIOR ART

The prior art hand-operated gear mechanisms for clocks or watches consist generally of a number of gearwheels whose shafts rest in two or three plate bars and serve to drive the second hand shaft, the minute hand tube, and the hour hand tube. Such gears have extremely costly parts, are difficult to assemble, and the mechanisms are therefore expensive. Moreover, they are very bulky. A gear mechanism of this type has the driving shaft provided with an eccentric whereon a gearwheel is loosely mounted which rolls off in a gear rim, secured against rotation and provided with an internal toothing. The rotation of the gearwheel is transmitted by a cross-type disc-clutch to the driven shaft. Such a gear mechanism requires substantially fewer structural parts, can be more easily assembled, and is of a more compact structure, than the first mentioned gear mechanisms. However, it has the disadvantage that the manufacture of the individual parts, partly on account of the required narrow tolerance limits, and partly on account of their external shape, is more expensive than that of the generally used hand mechanism gears. An unobjectionable function of these gears is assured only in the presence of sufficient lubricants, so that such gear mechanisms have not been successfully adopted in the field of horology.

SUMMARY OF THE INVENTION

The primary object of the invention is to overcome these disadvantages of the prior art. The invention aims therefore at producing a gear mechanism that consists of the least possible number of structural parts, can easily be assembled, contains easily manufacturable structural parts, presents the smallest structural volume possible, requires no attendance whatsoever, and permits the assembly without difficulties of several gears coaxially in succession.

On the basis of the gear mechanism initially described, these objects are being achieved, according to the invention, by the means of constructing both gearwheels as coaxially mounted crown wheels and providing a clutch fastened to the driving shaft in order to permit engagement of the crown wheel fastened to the driven shaft to the other, stationary crown wheel, over a small portion of their circumference in each instance, in such a manner that, at the rotation of the clutch device together with the driving shaft, the crown wheel mounted on the driven shaft rolls off on the stationary crown wheel while itself turning. The device called a clutch herein is more accurately called a coupling.

The gear of the invention has only three structural parts which are easy to manufacture and can be assembled without difficulties. The structural volume is extremely small, and a particular advantage of the gear mechanism of the invention is in its very flat shape. When conventional materials are used, the gear mechanism requires no attendance at all and can be produced with a very high, as well as a medium or small, transmission ratio, without additional expense, without loss of its advantages relating to its manufacture and assembly and is noiseless and accurate.

Both crown wheels may be of the conventional shape. For reasons of expediency in manufacturing and assembling, however, it is preferable to construct the rotary crown wheel as a disc which supports a crown gear rim and is fastened to the driven shaft so as to carry out a tumbler movement at the rotation of the clutch device. A further decrease in the structural height of the gear mechanism is accomplished, according to a further concept of the invention, by shaping the rotary crown wheel as a disc with a multiplicity of radial resilient fingers whose free ends are in each case converted to a pin. In such a structure a fastening of the disc to the driven shaft, which permits a tumbler movement of the disc, is dispensed with, and the structural height of the gear is decreased by the height in the space which is provided, in the embodiment first described, for the tumbler lift of the disc.

In order to keep the axial forces occurring at the place of the clutch device at the engagement of the two crown wheels, as small as possible, a thin, elastically deformable disc is provided. For the same reason the disc is provided with several recesses shaped as segments of circular rings, spaced from each other concentrically to the rotary axis of the disc in peripheral direction, and staggered in radial direction. Both devices can be applied separately or in combination.

In an embodiment preferred for reasons of manufacturing expediency, the disc and the parts fastened thereto or thereon form a one-piece integral unit of plastic material. The stationary crown wheel, which can likewise be made of plastic material, is most suitably molded to the gear case or the plate bar supporting the crown wheel. This simplifies substantially the assembly of the gear mechanism.

In a preferred embodiment, the clutch device includes an arm which extends in radial direction beyond the circumferential area of the crown wheels, with an angular end, and includes furthermore two clutch elements which bring about the engagement of the two crown wheels. In a preferred embodiment the clutch contains an arm which extends in radial direction and has an angular end which presses upon the circumferential area of the rotary crown wheel. This, however, results in unfavorable force conditions in the driving shaft, so that such a construction is generally only resorted to when a particularly small structural height of the gear is required.

Especially when only very small torques are available at the driving shaft, the clutch elements are shaped as rolls which rest freely rotatable on the angular end of the arm so as to hold the two crown wheels between themselves.

In another embodiment of the invention, the angular end is U-shaped and constructed so as to embrace the circumferential area of the crown wheels, and a cam is operatively connected with a crown wheel at opposite sides of each arm respectively. In such an embodiment, the frictional forces are somewhat higher in comparison to those of the first described embodiment, which requires that a definite minimum torque must be present in the driving shaft if the gear is to function satisfactorily, but such a structure is much easier to manufacture and to assemble. The cams may be riveted on the arm or molded thereto or therein. In order to secure an operation of the gear as noiseless and satisfactory as possible, in the case of the employment of a rotary crown wheel with a multiplicity of resilient fingers provided with pins, the cam associated with the pins extends in circumferential direction by at least the center-to-center distance of two adjacent pins.

In the case of very high numbers of revolutions of the initial drive, it may happen that the clutch device produces a greater imbalance of the driving shaft, especially when the clutch elements are shaped as rollers. The result is an increased wear on the shaft bearing. To avoid this, the arm of the clutch device at the end that faces the angular end is provided with a compensating weight.

BRIEF DESCRIPTION OF THE DRAWINGS

The invention will be explained in greater detail with the aid of the drawings which are in partly diagrammatical representation and on an enlarged scale. There are shown in--

FIG. 3, a planview of a crown wheel with resilient fingers which support pins;

FIG. 4, a section through the crown wheel as in FIG. 3, along line IV-IV;

FIG. 5, a section through two crown wheels at the place of coupling;

FIG. 6, a section through two other crown wheels at the place of coupling, and--

FIG. 7, a section through two further crown wheels at the place of coupling.

DESCRIPTION OF THE PREFERRED EMBODIMENTS

Figure 1:
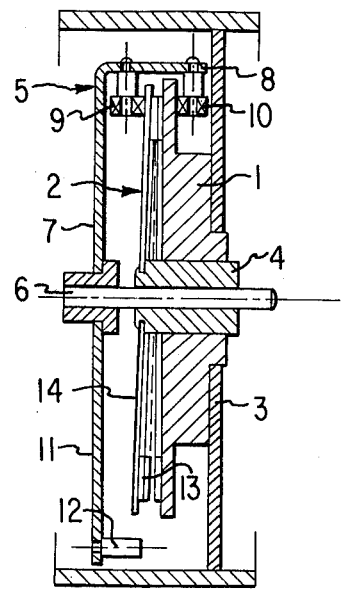
FIG. 1, a longitudinal section through a single-stage gear.

In the drawings same reference numerals denote same or equivalent parts. The gear mechanism according to FIG. 1, which can be used as hand mechanism gear for a clock or watch without indication of seconds, comprises two crown wheels 1 and 2, crown wheel 1 being fastened on a plate bar 3 in a rotation-proof manner. The crown wheel 2 is mounted on the driven shaft 4 of the gear and comprises a clutch device 5 which rests on the driving shaft 6 of the gear mechanism and is secured against a relative rotation. The drive of the gear mechanism takes place by means of a drive system not shown, e.g. a synchronous motor coupled with the end of shaft 6 that is associated with the clutch 5, while the shaft ends protruding from plate bar 3 are shaped so as to hold the hour hand or minute hand, respectively.

The clutch device of the gear mechanism consists of an arm 7 which extends in radial direction beyond the circumferential area of crown wheels 1 and 2 and is provided with an angular end 8. At this end, two rotatable rolls 9 and 10 with a rolling surface of rubber are provided which hold the two crown wheels 1 and 2 between them and make them engage each other at this place. The other end 11 of arm 7 is provided with a compensating weight 12 for compensating the imbalance produced by rolls 9 and 10.

The rotary crown wheel 2 is shaped as a disc 14 which carries a crown gear rim 13 and is fastened to the driven shaft 4 in such a manner that it carries out a tumbler movement when clutch device 5 rotates, and rolls off on the stationary crown wheel 1 while turning itself.

Figure 2:
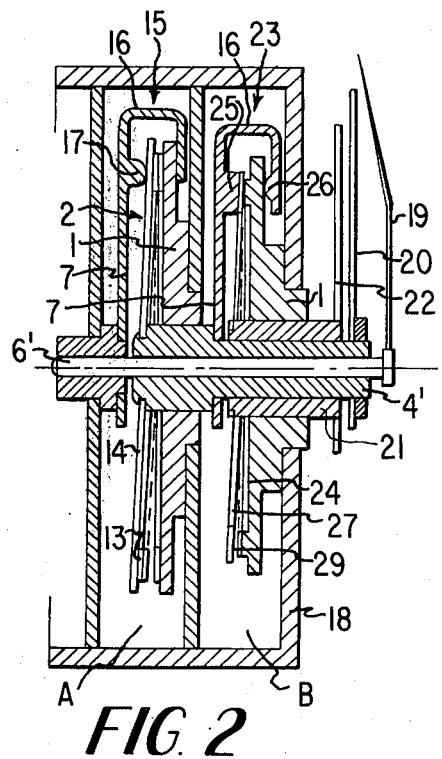
FIG. 2, a longitudinal section through a two-stage gear.

The gear mechanism according to FIG. 2, constructed as a hand mechanism gear for a clock or watch with a central indication of seconds, comprises two stages A and B; stage A reducing the number of revolutions of the drive system not shown, from one revolution per minute to one revolution per hour, and the stage B reducing the initial number of revolutions from one revolution per hour to one-twelfth of a revolution per hour.

The gear stage A differs from the gear according to FIG. 1 essentially only by a differently constructed clutch, and gear stage B, by its clutch and the rotary crown wheel. Clutch 15 of gear stage A is again provided with an arm 7 extending in radial direction and having a U-shaped angular end 16, which embraces the circumferential area of crown wheels 1 and 2 and is provided, on one side, with a cam 17. The other side abuts directly to the flat bottom surface of crown wheel 1. A driving shaft 6', which carries arm 7, extends through gear stage B and protrudes from casing 18. It constitutes the second hand shaft of the hand mechanism and carries the second hand 19. A shaft 4', likewise extended in forward direction and protruding from casing 18 carries the minute hand 20. It is the driving shaft with relation to gear stage B. The driven shaft 21 of gear stage B carries the hour hand 22.

A clutch device 23 of gear stage B is likewise provided with an arm 7 which extends in radial direction and is provided with an end 16 that is angular and U-shaped and embraces the circumferential area of crown wheel 24 and is provided at opposite sides with a cam 25 and 26 respectively.

The crown wheel 24 of gear stage B is, as particularly shown on FIGS. 3 and 4, shaped as a disc 27 with a multiplicity of radial, resilient fingers 28, which at their free end are in each case converted to a pin 29. Pins 29 have a circular cross section and are of cylindrical shape. However, the shape of pins 29 is optional within wide limits. Thus, tooth-shaped pins 29' (FIG. 6) or pins 29'' in the form of a unilaterally flattened cylinder (FIG. 7) can be employed with good success. The thin and resilient, but torsion-resistant disc 27 is provided, like disc 14, with six recesses 30 of circular-sector shape, three of which are in each case uniformly spaced over a circle concentrical to the axis of rotation of the disc and are uniformly staggered in radial direction. All crown wheels are made of one piece of plastic material.

As is shown in FIGS. 5 and 6, pins 29 and 29' respectively are pressed by the rigid clutch elements 25 and 26 respectively mounted on arm 17 and on the end 8 or 16 thereof, the clutch elements being drawn in shaded sections with lines running from the lower left to the upper right. In FIG. 7, the clutch element 25 operating with rotary clutch element 10, that is, ball bearings 10, accomplish a similar function with pins 29''. The pins are pressed successively into the stationary toothing of crown wheel 1, whereby, due to the different number of teeth or pins respectively in the two crown wheels 1 and 24, crown wheel 24 rolls off, while turning itself on stationary crown wheel 1 or respectively slides over stationary crown wheel 1.

What is claimed is:

1. A gear mechanism for transmission of small forces, such as a hand-mechanism gear for clocks or watches comprising:
   a driving shaft;
   a driven shaft mounted coaxially with the said driving shaft;

two gearwheels shaped as crown wheels, being respectively a stationary gearwheel and rotary driven gearwheel, and being mounted coaxially to each other;

each said gearwheel having a different number of teeth;

a coupling fastened to said driving shaft for rotation therewith;

said two gearwheels mounted to engage each other over a small portion of their circumferences and mounted in relation to the said coupling so that, when the coupling rotates with the said driving shaft, the rotary gearwheel mounted on the said driven shaft, while itself rotating, rolls off on the said stationary gearwheel, said rotary gearwheel being a thin, elastically deformable disc with a multiplicity of axially bendably resilient radial spring fingers, each said finger extending at its free ends into a pin.

said coupling comprising an arm with an angular arm end extending in a radial direction beyond the circumferential area of the gear wheels and two coupling elements mounted on the arm end, each element contacting one of the gear wheels to bring about the mutual engagement of the two gear wheels.

2. A gear mechanism as claimed in claim 1, said disc being provided with a plurality of recesses of a circular-ring segment shape, arranged concentrically to the axis of rotation of the disc in the direction of circumference and spaced from each other and staggered with respect to each other in radial direction.

3. A gear mechanism as claimed in claim 1, said disc with the said fingers and pins forming an integral one-piece unit of plastic material.

4. A gear mechanism as claimed in claim 1, further comprising a gear housing and a plate bar, said stationary gearwheel being molded to the said gear casing.

5. A gear mechanism as claimed in claim 1, further comprising a gear housing and a plate bar, said stationary gearwheel being molded to the said plate bar.

6. A gear mechanism as claimed in claim 1, said two coupling elements being shaped as rollers and mounted to rest on the said angular end, freely rotatable and holding between them said gear.

7. A gear mechanism as claimed in claim 1, the said angular end being U-shaped and furthermore shaped to embrace the circumferential area of the said gear wheels, each said gearwheel comprising a cam provided at opposite sides of each said arm respectively.

8. A gear mechanism as claimed in claim 7, each said cam being associated with the said pins and shaped to extend in the direction of circumference by at least the center-to-center distance of two adjacent said pins.

9. A gear mechanism as claimed in claim 1, said arm being provided at the end facing the said angular end with a compensating weight.

* * * * *